(12) United States Patent
Kuenemund (10) Patent No.: US 7,916,517 B2
(45) Date of Patent: Mar. 29, 2011

(54) CIRCUIT ARRANGEMENT AND METHOD FOR RECOGNIZING MANIPULATION ATTEMPTS

(75) Inventor: Thomas Kuenemund, Munich (DE)

(73) Assignee: Infineon Technologies AG (DE)

(*) Notice: Subject to any disclaimer, the term of this patent is extended or adjusted under 35 U.S.C. 154(b) by 179 days.

(21) Appl. No.: 11/561,184

(22) Filed: Nov. 17, 2006

(65) Prior Publication Data

US 2007/0171099 A1    Jul. 26, 2007

(30) Foreign Application Priority Data

Nov. 18, 2005  (DE) .................. 10 2005 055 158

(51) Int. Cl.
*G11C 11/00*    (2006.01)
(52) U.S. Cl. .................. 365/154; 365/185.04
(58) Field of Classification Search .................. 365/154, 365/185.04; 714/48, 799, 823
See application file for complete search history.

(56) References Cited

U.S. PATENT DOCUMENTS

| | | | | |
|---|---|---|---|---|
| 4,328,583 A * | 5/1982 | Stodola | ........... | 714/812 |
| 4,342,112 A * | 7/1982 | Stodola | ........... | 714/816 |
| 5,483,542 A * | 1/1996 | Nguyen | ........... | 714/704 |
| 6,225,826 B1 | 5/2001 | Krishnamurthy et al. | | |
| 6,253,350 B1 * | 6/2001 | Durham et al. | ........... | 714/823 |
| 6,947,342 B2 * | 9/2005 | Ishida et al. | ........... | 365/203 |

* cited by examiner

*Primary Examiner* — Huan Hoang
*Assistant Examiner* — Anthan T Tran
(74) *Attorney, Agent, or Firm* — Dickstein Shapiro LLP (57) ABSTRACT

A circuit arrangement having complementary data lines of a dual rail data bus, wherein in a regular operating phase the complementary data lines carry complementary signals, and in a precharge phase the complementary data lines assume an identical logic state or the same electrical potential. The circuit arrangement also has a device for detecting manipulation attempts, the device having a detector circuit, which outputs an alarm signal upon the occurrence of an identical logic state on both data lines in the regular operating phase.

17 Claims, 6 Drawing Sheets

CIRCUIT ARRANGEMENT AND METHOD FOR RECOGNIZING MANIPULATION ATTEMPTS

CROSS-REFERENCE TO RELATED APPLICATION

This application claims priority to German Patent Application Serial No. 10 2005 055 158.0, which was filed Nov. 18, 2005, and is incorporated herein by reference in its entirety.

BACKGROUND OF THE INVENTION

The invention relates to a circuit arrangement comprising complementary data lines, in particular data lines of a dual rail data bus or in the case of a memory circuit comprising a plurality of memory cells which are connected to complementary data lines, in a regular operating phase the complementary data lines carrying complementary signals, and in a precharge phase the complementary data lines assuming an identical logic state or the same electrical potential, and a device for detecting manipulation attempts. Moreover, the invention relates to a method for detecting manipulation attempts in the case of a circuit arrangement having complementary data lines, in a regular operating phase the complementary data lines carrying complementary signals, and in a precharge phase the signals on the complementary data lines being brought to an identical logic state. Moreover, the invention relates to a method for detecting manipulation attempts in the case of a circuit arrangement having complementary data lines.

In many circuits measures are provided in order to prevent data from being able to be read out from specific memory areas. This is necessary particularly when security-critical data are processed, as is often the case with smart cards. Smart cards are used as an authentication tool or for banking applications, which increases the security requirements. The measures for restricting access are implemented at the level of an operating system or an application, a limitation to specific address ranges or specific addresses being performed. The protective measures make it possible to ensure that only specific users or specific applications can access security-critical data.

Attackers assume the aim of overcoming the security measures implemented and of obtaining access to secret data. A further aim may be to gain knowledge about the construction of the circuit.

Attack Possibilities

In order to attain the desired information about memory content or circuit construction, firstly so-called reverse engineering is carried out, in the course of which the integrated circuit is analyzed. Afterward, inter alia, the functioning of the circuit is altered or a data manipulation is carried out in the memory. Typically, during this analysis, the material that covers the chip and also a portion of the upper layers protecting the wiring of the chip are removed. The upper interconnects then uncovered are usually lines which are not security-relevant and which can be bypassed by means of so-called bypass lines in order to reach further to deeper layers and lines. With some effort these steps can be carried out nowadays by means of the "FIB" method ("Focussed-Ion-Beam"). As soon as more deeply situated, security-relevant and hence critical lines have been reached, either signals and pulses can be tapped off at the lines (so-called "Probing"), or it is possible to apply signals to the lines in order to manipulate data (so-called "Forcing").

In an attack using ionizing radiation, data are altered on lines of the circuit arrangement, so that complete supervision by the security mechanisms implemented is no longer possible. This exploits the physical effect that, in the case of reverse-biased pn junctions, a charge separation and, as a result, a short circuit are effected if an ionizing radiation, that is to say a radiation that generates electron-hole pairs, such as photons or alpha-particles acts on the pn junction. As a result of the short circuit, it can happen that the signal state of a data line changes from "1" to "0" or from "0" to "1", so that "incorrect" data are subsequently worked with. By way of example, data are consequently read out from memory areas which are actually blocked for access.

Defence Measures

In the past the aim has been to prevent or at least make more difficult the analysis and manipulation of the integrated circuits by means of the particular construction of the circuit. This has been attempted to be achieved, on the one hand, by means of a concealed structuring of the critical lines in the wiring plan and, on the other hand, by application of a dedicated covering shield over the relevant wiring planes. In the case of these shields, meandering or grid-type lines are realized e.g. in pairs in the shield, upon the interruption or short circuit of which, for the case where different voltages are present, the detecting sensor instigates an erasure of the memory, a reset or the inoperability of other circuit sections. An embodiment of these lines, which are called "passive", as unconnected voltageless lines is likewise possible. In this case they serve only for increasing the outlay during the attack or for confusion.

The security of the components can also be increased by the passive lines described being replaced by so-called active lines in the design of the wiring plan. In the case of the lines, signals are applied to the lines of the shield by drive circuits, which signals are analyzed by evaluation circuits and compared e.g. with reference signals. Owing to the possible variation of the signals, the shield can be circumvented in this case only by the very complicated laying of a bypass line and by the application of the FIB method.

In the case of attacks using ionizing radiation or targeted fluctuations of the supply voltage, one possibility for defence consists in registering the causes of the manipulations, that is to say detecting the ionizing radiation or the supply voltage fluctuations. This requires the presence of specially provided sensors which are sensitive to the different types of attack in different attack scenarios. One disadvantage of this procedure is that the sensors are only ever sensitive to a limited set of attacks, and so for example new attacks to which a set of sensors of a cryptographic circuit is not sensitive with some probability will lead to a successful error attack. A further disadvantage is that, on account of the wealth of attack scenarios, the number of sensors for an integrated circuit in the context of high security requirements has to be very high. If only few sensors are provided, no protection is afforded against "local radiation attacks" on individual or some memory cells or gates. Many sensors constructed using complicated analog technology significantly increase the costs of such a cryptographic circuit. This becomes apparent in a disadvantageous manner particularly in the case of mass-produced articles such as chip cards and smart cards. Consequently, the integration of light and spike sensors embodied as analog circuits on ICs for security applications is not an optimum solution to the above problem.

Instead or in addition, in the past it has also been attempted not to detect the manipulation itself, but rather to deduce the presence of a manipulation on the basis of the effect of the manipulation. The effect of a manipulation is changed data.

Therefore, memory contents are usually protected by error detecting codes (EDC), but this leads to significantly increased outlay in respect of area since this necessitates EDC evaluation and generation circuits.

BRIEF DESCRIPTION OF THE DRAWINGS

The invention is described in more detail below on the basis of exemplary embodiments. In the figures.

DESCRIPTION OF THE INVENTION

The invention specifies a circuit arrangement in which a device for detecting manipulation attempts is configured simply, but nevertheless efficiently in terms of its effect. In this case, the intention is to detect, in particular, radiation attacks on memory circuits, in particular RAM and ROM memories, and also on data buses. At the same time, the circuit is intended to have a reduced energy conversion. Furthermore, the intention is to specify a corresponding method.

The device for detecting manipulation attempts comprises a detector circuit, which outputs an alarm signal upon the occurrence of an identical logic state on both data lines in the regular operating phase. In one advantageous configuration of a circuit arrangement according to the invention, an alarm signal is likewise output upon the occurrence of an identical logic state on both data lines in the precharge phase if the logic state is opposite to the precharge state.

The circuit arrangement configured according to the invention exploits the fact that complementary signal states are present on the bit lines if a valid datum is involved. During attacks on the circuit arrangement using ionizing radiation, the signal states are changed in such a way that an invalid combination of signal states arises.

In this case, it may be provided that the drive circuits of the bit line pairs of RAM and ROM memories and also bus structures are configured or combined with digital circuits which are sensitive to the effect of ionizing radiation. This increases the probability of an invalid signal state arising on the complementary data lines in the event of an attack using ionizing radiation, so that a manipulation attempt is detected with increased probability. In this case, the same physical effect is exploited for the detection of an attack using ionizing radiation as for the attack itself. In the case of reverse-biased pn junctions, a charge separation and, as a result, a short circuit are effected if they are exposed to ionizing radiation, that is to say radiation that generates electron-hole pairs such as photons or alpha-particles.

The measures according to the invention make it possible to operate bus structures and also small to medium size RAM and ROM memories, that is to say up to a few kbytes, with requirements made of the access time within the range starting from approximately 5 ns up to a few tens of ns, it being possible at the same time to work with a potential difference between complementary bit lines that is reduced to a few hundreds of mV without "expensive" analog circuits having to be used in this case.

A further effect of the measures according to the invention consists in shorter access times since less charge has to be converted. The reason for this is that, as explained below, the equalize transistor is provided and a threshold voltage, which reduces the charge to be equalized, is dropped across the pass gate transistors. Moreover, an increased sensitivity of the digital circuits for the detection of radiation attacks is achieved. A further significant increase in this sensitivity is achieved by means of the datum written or read last being held between two respective accesses on the complementary elements of a bit line pair, rather than being precharged to VDD as usual.

A method of the type mentioned in the introduction includes comparing the signal states on the complementary data lines and generating an alarm signal if identical logic signal states which are opposite to the precharge state are ascertained in the regular operating phase.

Figure 1:
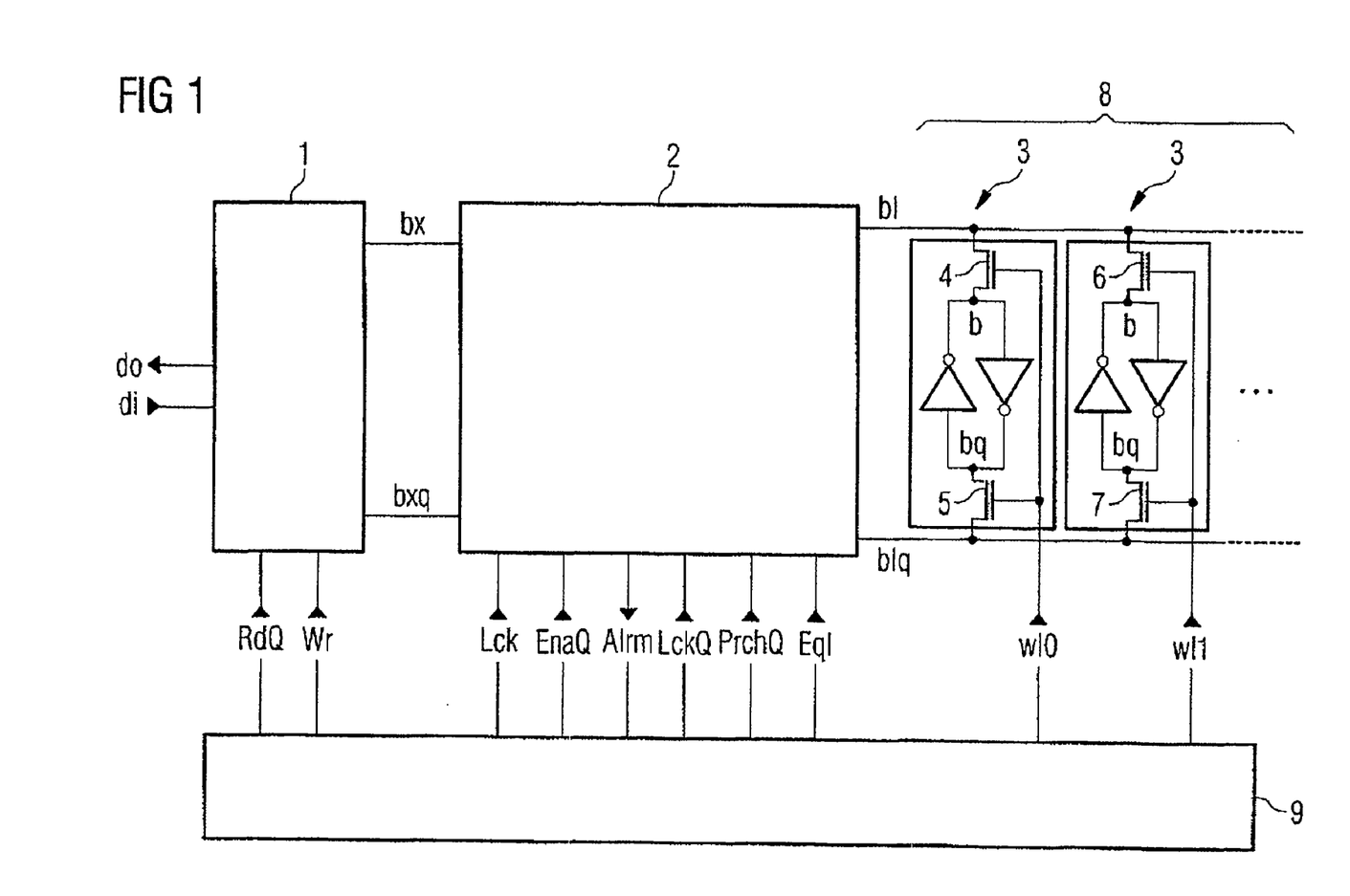
FIG. 1 shows an SRAM bit slice.

FIG. 1 shows, viewed from left to right, a read-write circuit 1 for the data transfer during writing from the data input di to the external or internal bit line pair bx, bxq or bl, blq, respectively, and also the data transfer during reading from the bit line pair bl, blq via the bit line pair bx, bxq to the data output do. This circuit is explained in more detail with reference to FIG. 2.

A control circuit 2 having three functions LATCH, that is to say temporary storage of the data read or written last on the bit line pair bx, bxq or the bit line pair bl, blq, PRECHARGE, that is to say precharging of the bit line pairs bx, bxq and bl, blq directly prior to a read access, and also ALARM, that is to say outputting of an alarm signal for indicating that the bit line pair bx, bxq or the bit line pair bl, blq is in a state which can never occur in normal operation but can be brought about by an attack using ionizing radiation or some other signal-altering attack. This circuit is explained in more detail with reference to FIG. 3.

Conventional six-transistor SRAM cells 3 are arranged in a memory cell array 8 along the bit line pair bl, blq. Via n-channel transistors 4 ... 7, the gate terminals of which are connected to the word lines wl0, wl1, ..., the cell nodes b and bq of the cells can be conductively connected to the bit line pair bl, blq (for high supply potential VDD at wl0, wl1, ...) or be insulated from bl, blq (for low supply potential VSS at wl0, wl1, ...).

The control signals for the read-write circuit 1, the control circuit 2 and the memory cell array 8 are provided by a supervisory circuit 9, which may be divided into a plurality of blocks within the entire circuit arrangement.

Figure 2:
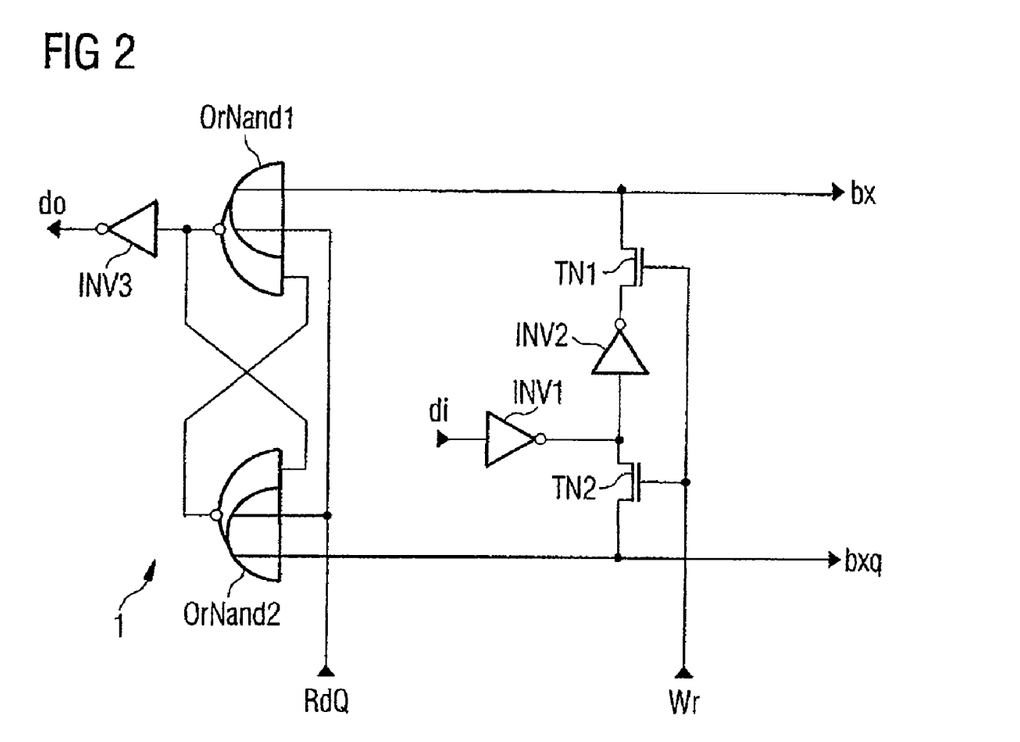
FIG. 2 shows a read-write circuit.

FIG. 2 shows, on the one hand, a device comprising the inverters INV1 and INV2 and also the n-channel transistors TN1 and TN2 for transferring data at the data input di onto the bit lines bx, bxq. For high supply potential VDD at the control signal Wr, TN1 and TN2 are switched on, so that a "0", that is to say low supply potential VSS, at di is transferred via INV1, INV2 and TN1 to bx, while bxq, via INV1 and TN2, assumes the value VDD-VTN since an n-channel threshold voltage VTN is dropped across TN2. Analogously to this, by virtue of a "1", that is to say the potential VDD at di, a "0" is transferred to bxq via INV1 and TN2, while bx, via INV1, INV2 and TN1, assumes the value VDD-VTN since an n-channel threshold voltage VTN is dropped across TN1. For low supply potential VSS at Wr, TN1 and TN2 are turned off, so that there is no connection from di to the bit lines bx, bxq, that is to say that the writing device is deactivated.

On the other hand, there is a device, comprising the gates OrNand1, OrNand2 and INV3, for transferring data on the bit lines bx, bxq to the data output do, and also for storing the data read last, so that no unnecessary state changes whatsoever, so-called "dynamic hazards", can occur at do. This circuit, a so-called RS Latch, is activated as soon as the control signal RdQ assumes the value VSS and if a valid datum is present on bx, bxq, that is to say or (0, 1) or (1, 0). The precharge state (1, 1) on the bit lines bx, bxq thus means that the value read previously is still present at do, while (0, 0) on bx, bxq represents a state which can never occur in normal operation, but can be brought about by an attack using ionizing radiation, and which constrains the then irrelevant value "0" at do if RdQ is equal to VSS. Therefore, with the transition from (1, 1) to (0, 1) or (1, 0), the RS latch is switched on via the data inputs bx, bxq if RdQ was previously set to VSS.

Figure 3:
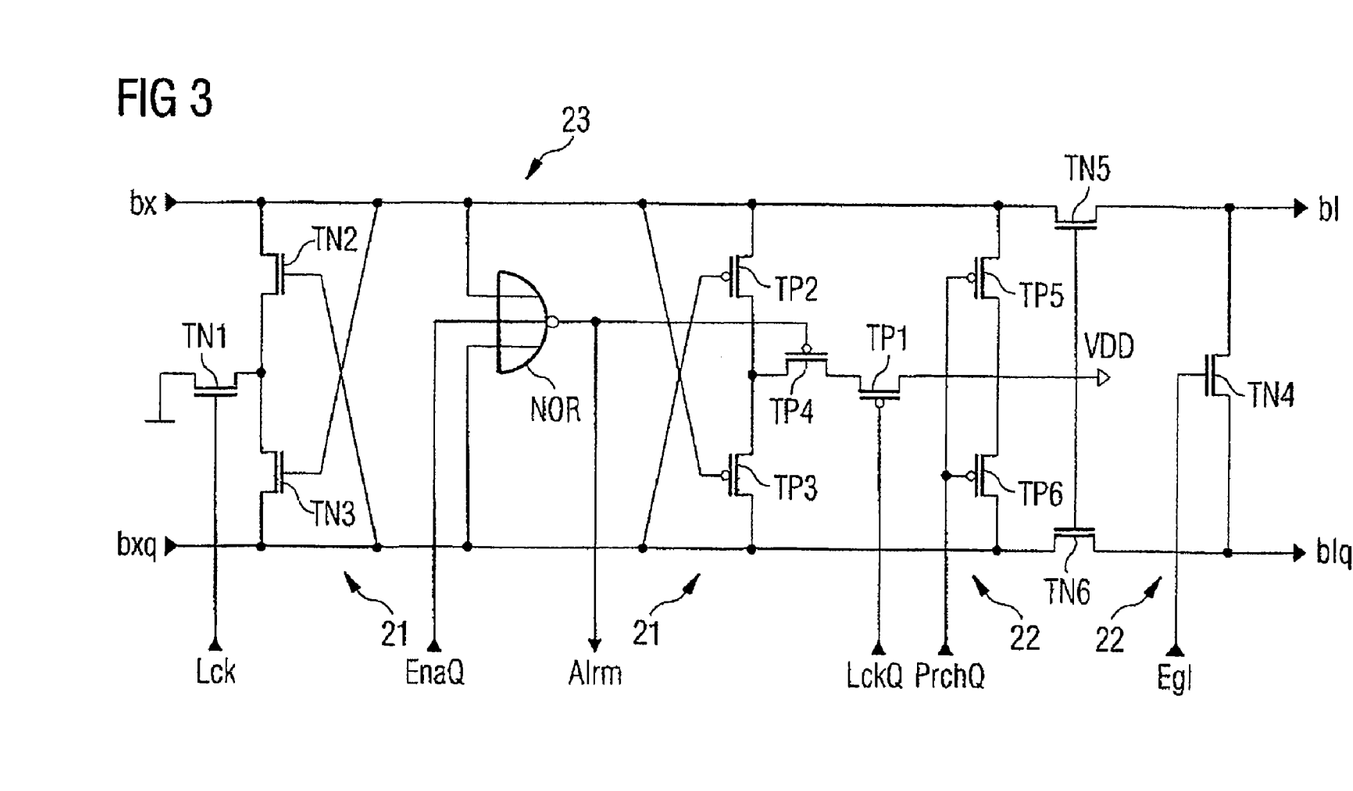
FIG. 3 shows a detailed illustration of the interposed control circuit of the SRAM bit slice.

FIG. 3 shows the control circuit 2 with the functions LATCH, PRECHARGE and ALARM. The partial function "LATCH" is realized by the latch 21 with the n-channel transistors TN1, TN2, TN3 and also the p-channel transistors TP1, TP2, TP3, TP4, it being possible for the latch 21 to be connected to VSS via TN1 and to VDD via TP1 and TP4: if the control signal Lck assumes the value VDD or VSS, "Latch" is connected to VSS or disconnected from VSS, respectively; if the control signal LckQ and the alarm output Alrm assume the value VSS, "Latch" is connected to VDD, while "LATCH" is isolated from VDD for LckQ or Alrm equal to VDD. The transistors TN1, TN2 and TP1, TP2 realize the feedback between the bit lines bx and bxq or the storage function if "LATCH" is connected to VDD and VSS. It is evident from this that the bit line pair bx, bxq itself represents the pair of "latch nodes" for the data written or read last, that is to say remains either in the state (0, 1) or in the state (1, 0) between two accesses, which considerably increases the sensitivity toward radiation attacks (see below).

The partial function "PRECHARGE" is realized by a precharge controller 22 with the p-channel transistors TP5, TP6 and the n-channel transistor TN4: if the control signal PrchQ assumes the value VSS, then the bit lines bx and bxq are conductively connected to VDD via TP5 and TP6 and isolated from VDD for PrchQ equal to VDD, while the two bit lines bl and blq are conductively connected to one another for Eql equal to VDD, which initiates and accelerates the precharge operation by means of charge equalization between bl and blq, and also ensures that, at the end of a precharge phase, both bit lines are to a very good approximation at the same potential, even if the threshold voltages of the two n-channel transistors TN5, TN6 deviate from one another. In the case of Eql equal to VSS, bl and blq are isolated from one another. The latter transistors connect bx and bl and, respectively, bxq and blq to one another and ensure that bl and blq are only precharged to VDD-VTN since an n-channel threshold voltage VTN is in each case dropped across TN5, TN6. The voltage may be 0.5 V, by way of example. This measure has the effect, on the one hand, that less charge and hence energy is converted on bl and blq, which in turn results in shorter access times, and means, on the other hand, that in the case of a radiation attack on bl and/or blq a smaller charge transfer suffices to bring about the "alarm state" bl, blq=(0, 0), that is to say makes the circuit more sensitive to detectable radiation attacks.

Reduced energy conversion in RAM and ROM memories and also for data buses is usually coupled with the requirements for very large storage capacities and also very short access times within the range of from one up to a few nanoseconds. The circuit concepts used for this comprise potential differences between complementary bit lines that are reduced to a few tens of mV to hundreds of mV and also analog circuits (sense amplifier) for the very fast assessment of these small potential differences and also the conversion thereof to potential differences in the region of the difference between a high and a low supply voltage (VDD and VSS, respectively) for the further digital processing of the data.

However, this procedure loses its efficiency for medium and small memory sizes or in the case of moderate requirements made of access or data transfer times since analog sense amplifiers and their drive circuits themselves have a considerable area and energy demand. A further disadvantage of these circuits—primarily starting from 130 nm technologies—consists in an increased susceptibility to interference on account of the very small potential differences to be assessed and also the particular symmetry requirements and the high precision required with regard to the temporal sequence of the control signals for the analog circuits.

The abovementioned construction results in a small energy conversion without extremely small potential differences having to be used.

Finally, the partial function "ALARM" is realized by a detector circuit 23 with the NOR gate NOR, the three inputs of which are connected to bx, bxq and the control signal EnaQ, with which "ALARM" can be activated (for EnaQ=VSS) or deactivated (for EnaQ=VDD). The output Alrm of NOR becomes equal to "one" or VDD, precisely when bx=bxq=EnaQ=VSS. For a plurality of bit line pairs arranged parallel, the respective Alrm signals can be logically ORed, e.g. by means of a "Wired Or", so that a single alarm state on one of the bit line pairs suffices to be able to indicate a detected radiation attack.

As described above, the bit line pair bx, bxq remains, between two accesses, either in the state (0, 1) or in the state (1, 0), rather than in the precharge state (1, 1) as in conventional SRAMS, which considerably increases the sensitivity toward radiation attacks since now only one of the two nodes bl and bx, respectively, or blq and bxq, respectively, has to be discharged by ionizing radiation in order to bring about the "alarm state", which discharge is highly probable also as a result of the fact that there are generally arranged along bl and blq a plurality of n-channel transistors and hence $n^+$-p junctions which, when impinged upon by ionizing radiation, provide for a transfer of negative charge on bl or blq, respectively.

In the case of an imminent read access, the bit line pairs are precharged as described above, that is to say that for a few nanoseconds bx and bxq will be at VDD and bl and blq will be at VDD-VTN, which reduces the sensitivity toward radiation attacks for a very short time if the attack takes place precisely during the precharge phase and results in only a very momentary charge transfer. However, this last considerably limits the attacker's options.

In the case of a write access, "ALARM" is switched off momentarily, that is to say for approximately one nanosecond, which is effected by means of EnaQ=VDD, since, when writing (via TN1, TN2 from FIG. 2) from di to bx, bxq, levels between VSS and VDD can occur momentarily on bx, bxq. However, this does not mean a significant limitation owing to the large time constants relative thereto for charge transfers as a result of radiation attacks and the decay thereof on the bit lines.

Figure 4:
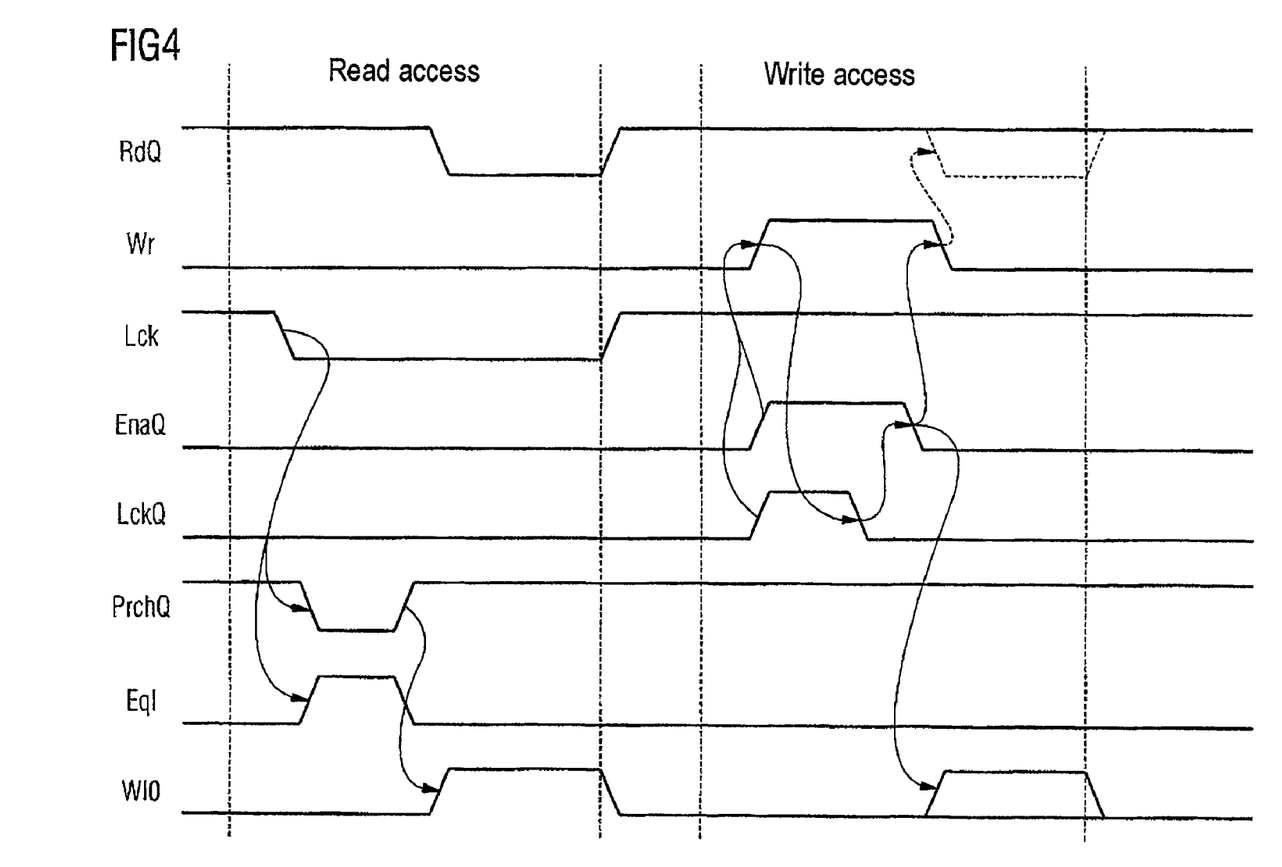
FIG. 4 shows a signal diagram for the circuit according to FIGS. 1 to 3.

Details of the temporal sequence of write and read accesses are illustrated in FIG. 4. For a read access, firstly Lck is set from VDD to VSS in order to prevent charge from being able to flow away via the transistors TN1, TN2, TN3 from FIG. 3 if PrchQ switches from VDD to VSS and Eql switches from VSS to VDD and thus initiate the precharge phase. After the conclusion of the precharge phase, that is to say that as soon as PrchQ is at VDD again, and Eql is at VSS again, one of the word lines wl of the SRAM cells is raised from VSS to VDD in order to read out the corresponding cell content on bl, blq or bx, bxq, respectively. In parallel with this, RdQ is activated, that is to say switched to VSS, in order to output the data on bx, bxq to do. With the concluding deactivation of wl, that is to say a transition from VDD to VSS, and RdQ, that is to say a transition from VSS to VDD, Lck is raised from VSS to VDD, whereby the currently read datum is held in the "LATCH", that is to say on the bit lines.

For a write access, firstly LckQ and EnaQ are deactivated, that is to say raised from VSS to VDD, in order to prevent charge from being able to flow through the transistors TP1, TP2, TP3, TP4 from FIG. 3 or the gate NOR from FIG. 3 during the following write operation, and in order to ensure that no false alarm can occur at the output Alrm of NOR for the duration of the write operation. Directly after the rising edges of LckQ and EnaQ, the write operation is initiated by the rising edge of Wr, in which operation, as described above, bx or bxq is brought to VSS and the respectively complementary node is brought to VDD-VTN if the value previously stored on bx and bxq does not match the datum that is to be newly written, in which case the potentials (VSS and VDD) at bx and bxq do not change. Since this operation proceeds very rapidly, namely within fractions of a nanosecond when using modern technologies below a feature size of 0.25 μm, LckQ can shortly afterward be activated again, that is to say switched to VSS, as a result of which the node bx or bxq previously at VDD-VTN, if appropriate, is raised to the full level VDD. This means, however, that EnaQ can also be activated again, that is to say switched to VSS, since neither shunt currents nor a false alarm are now to be expected. With the falling edge of either LckQ or EnaQ, Wr can then be deactivated again, that is to say lowered to VSS, since the written datum is now stored on bx, bxq or bl, blq, respectively, and one of the word lines wl of the SRAM cells can be activated, that is to say raised to VDD, whereby the datum is written to the corresponding SRAM cell. At the same time, RdQ could also be activated, that is to say lowered to VSS, whereby the datum would also be output on do, that is to say that a "write through" from di to do would be realized. The write cycle is ended with the switch-off of wl to VSS and, if appropriate, the deactivation of RdQ by raising to VDD.

Figure 5:
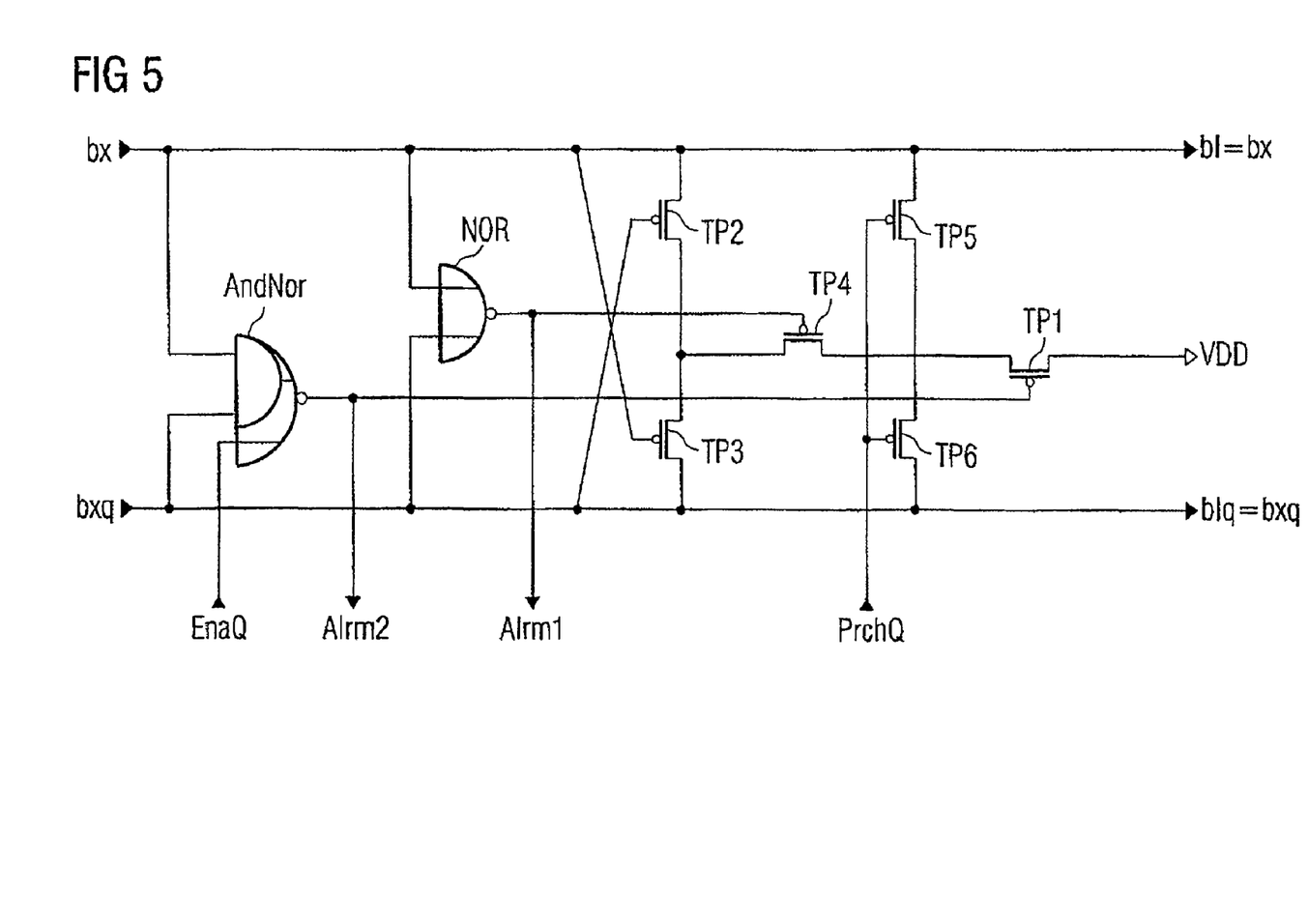
FIG. 5 shows an alternative interposed control circuit of the SRAM bit slice with a precharge and alarm function.

FIG. 5 shows an alternative to the control circuit specified in FIG. 3 with the functions "LATCH", "PRECHARGE" and "ALARM". In this case, the circuit of FIG. 5 lacks the partial function LATCH provided in the circuit of FIG. 3, that is to say that with the circuit of FIG. 5 it is assumed, as is customary for conventional SRAMS, that the data written or read last do not remain stored on the bit line pair (bx, bxq). Instead, once again as is customary for conventional SRAMS, it is presupposed that a precharge of the two bit lines bx and bxq to VDD is carried out between in each case two arbitrary accesses (reading or writing).

Moreover, once again as is customary for conventional SRAMs, the n-channel transistors TN4, TN5, TN6 have been omitted in the exemplary embodiment of FIG. 5. Therefore, bx=bl and bxq=blq hold true, which incidentally is of secondary importance, however, for the present invention, that is to say that the circuits described below and their function do not depend on the presence of TN4, TN5 and TN6.

The exemplary embodiment specified in FIG. 5 is directed at detecting impermissible or "Alarm" states of the bit line pair bx, bxq or bl, blq. On the one hand, the bit line pair bx, bxq is checked by means of the gate NOR with regard to the impermissible state near (0, 0) or (VSS, VSS), which can never occur in normal operation, that is to say will consequently arise only as a result of an attack. In the case of such a detected state, that is to say with Alrm1=VDD, the feedback between the bit lines that previously exists via TP2 and TP3 is additionally interrupted via the now non-conducting transistor TP4, which considerably increases the sensitivity of the alarm circuit.

On the other hand, the "Precharge" state of the bit lines, that is to say bx, bxq=(1, 1) or (VDD, VDD), is also checked for validity by means of the gate AndNor. With the precharging or shortly after the precharging of the bit lines was activated by setting PrchQ to VSS, EnaQ is also activated, that is to say switched from VDD to VSS. This means, however, that AndNor is sensitive to the "alarm case", that is to say to the fact that at least one of the bit lines assumes the (impermissible) state "near 0" or "near VSS". In the case of such a detected state, that is to say with Alrm2=VDD, the feedback between the bit lines that previously exists via TP2, TP3 and also the conductive connection of the bit lines to VDD that previously exists via TP5, TP6 is additionally interrupted via the now non-conducting transistor TP1, which considerably increases the sensitivity of the alarm circuit. The deactivation of PrchQ and EnaQ can be effected simultaneously since immediately afterward a read or write access takes place which is monitored by the gate NOR as described above.

Figure 6:
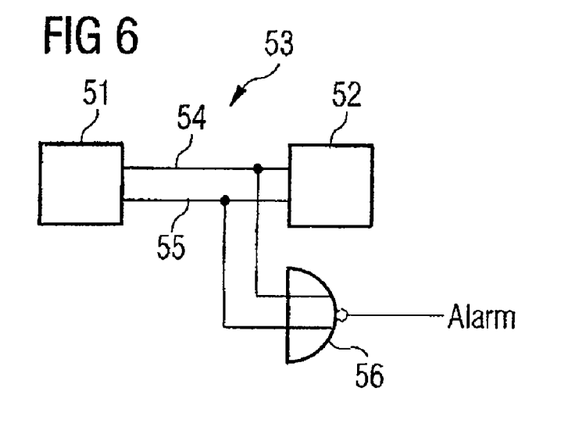
FIGS. 6 to 8 show further exemplary embodiments with a dual rail bus structure.

FIG. 6 shows a further circuit arrangement configured in the manner according to the invention. Two dual rail circuit components 51 and 52 are connected to one another via a dual rail data bus 53. The data bus 53 has two complementary data lines 54 and 55. Furthermore, an OR gate 56 is provided, two inputs of the OR gate 56 being connected to in each case one of the complementary data lines 54 and 55. An alarm signal Alarm is output at the output of the OR gate 56 if the signal state on both data lines 54 and 55 is "0". This is because while both data lines 54 and 55 correctly carry the signal "1", in a precharge phase, the state with a "0" on both data lines is an error state which can occur only when a manipulation altering the signal states on the data lines has been carried out.

Figure 7:
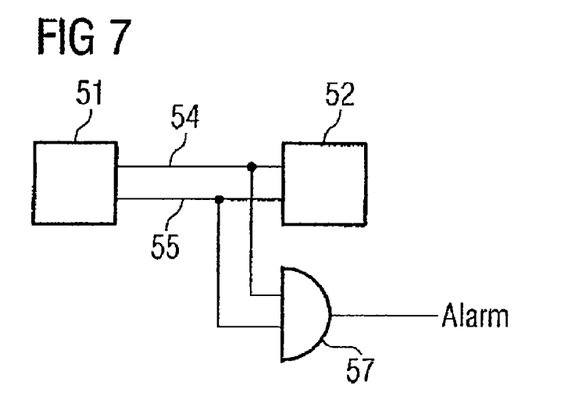

In the exemplary embodiment of FIG. 7 it is provided that a "0" is present on both data lines in the precharge phase. In this case, a "0" on both data lines would not describe an erroneous state, but a "1" on both data lines 54 and 55 would not be permissible and would indicate an attack. In order to detect a manipulation attempt in the case of this circuit, the two data lines 54 and 55 are connected to a logic gate 57, which is an AND gate.

It goes without saying that the logic functions can also be realized by an interconnection of different gates. This applies not only to the data bus shown in FIGS. 5 and 6 but also to the memory device shown in the previous figures and other circuit arrangements having complementary data lines.

Figure 8:
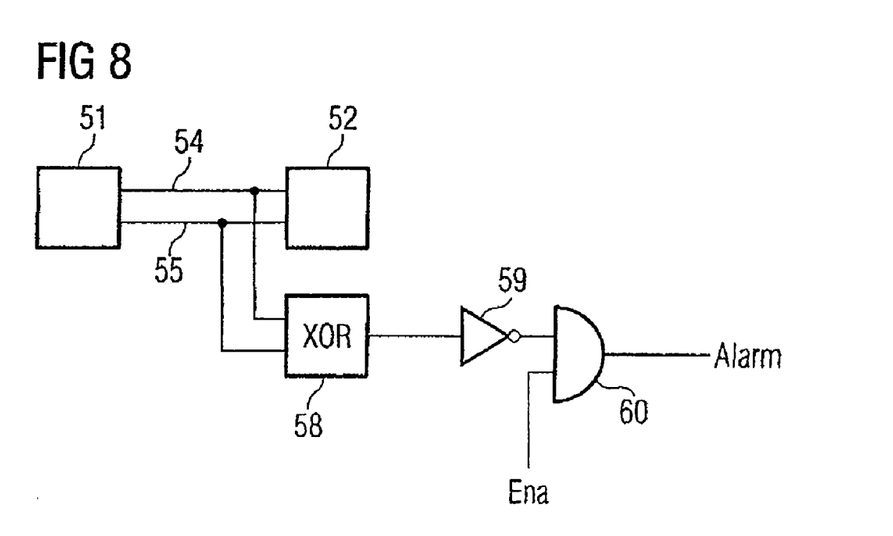

In the case of the exemplary embodiment shown in FIG. 8 it is provided that both the states (0, 0) and (1, 1) are rated as a manipulation result. This would have the effect that an error would always be presumed in a precharge phase. In order to avoid this, the comparison result is passed to an additional AND gate 60, which combines the comparison result with an activation signal Ena. Through corresponding generation of the activation signal Ena it can be ensured that the manipulation detection is deactivated during the precharge phase. Although this solution has the advantage, on the one hand, that a signal state corresponding to the precharge state can also be detected as a manipulation attempt, on the other hand no manipulation detection is possible during the precharge phase.

In an extended configuration of the exemplary embodiment of FIG. 8, which is not illustrated, however, the embodiments of FIG. 6 and FIG. 8 are combined. While a manipulation detection in accordance with FIG. 8, although without the AND gate 60, would be carried out in a normal operating phase, the circuit of FIG. 6 could be used in a precharge phase.

Further configurations of circuits according to the invention are within the discretion of the person skilled in the art. The invention is not restricted to the exemplary embodiments shown. In particular, elements of the exemplary embodiments shown can also be combined with one another.

The invention claimed is:

1. A circuit arrangement comprising:
    complementary data lines of a dual rail data bus, wherein in a regular operating phase the complementary data lines carry real-time complementary dual-rail data signals, and in a precharge phase the complementary data lines assume an identical logic state or the same electrical potential; and
    a device that detects manipulation attempts, the device comprising a latch and a detector circuit, wherein the device outputs an alarm signal upon the occurrence of an identical logic state on both data lines in the regular operating phase without dependence on a clock signal.

2. The circuit arrangement as claimed in claim 1, wherein the detector circuit outputs an alarm signal upon the occurrence of an identical logic state on both data lines, in the precharge phase if the logic state is opposite to the precharge state.

3. The circuit arrangement as claimed in claim 1, wherein the detector circuit comprises a logic circuit, with a respective input of the logic circuit being connected directly in each case to one of the complementary data lines.

4. The circuit arrangement as claimed in claim 1, further comprising pass gate transistors connected downstream of the detector circuit on the bit lines; and
    a connecting transistor, which is connected downstream of said pass gate transistors, to connect the bit lines to one another.

5. The circuit arrangement as claimed in claim 3, wherein the logic circuit realizes a NOR function.

6. The circuit arrangement as claimed in claim 3, wherein the logic circuit realizes a OR function.

7. The circuit arrangement as claimed in claim 3, wherein the logic circuit realizes a AND function.

8. The circuit arrangement as claimed in claim 3, wherein the logic circuit realizes a XOR function.

9. The circuit arrangement as claimed in claim 3, wherein the logic circuit combines signals on the complementary data lines and an activation signal with one another, it being possible for the generation or outputting of an alarm signal to be prevented by a first state of the activation signal.

10. The circuit arrangement as claimed in claim 9, wherein, in the case of a write operation, during an precharge phase, the generation or outputting of an alarm signal is prevented by the first state of the activation signal.

11. A circuit arrangement comprising:
    complementary data lines of a dual rail data bus, wherein in a regular operating phase the complementary data lines carry real-time complementary dual-rail data signals, and in a precharge phase the complementary data lines assume an identical logic state or the same electrical potential;
    a read-write circuit;
    a control circuit, which is disposed downstream of the read-write circuit, for detecting manipulation attempts, the control circuit comprising a latch, a precharge controller, and a detector circuit, wherein the control circuit outputs an alarm signal upon the occurrence of an identical logic state on both data lines in the regular operating phase, without dependence on a clock signal; and
    a memory cell array disposed downstream of the control circuit.

12. The circuit arrangement as claimed in claim 11, wherein the memory cell array has a plurality of SRAM memory cells.

13. A method for detecting manipulation attempts in a circuit arrangement having complementary data lines, in a regular operating mode the complementary data lines carrying real-time complementary dual-rail data signals, and in a precharge phase the signals on the complementary data lines being brought to an identical logic state the circuit arrangement further comprising a control circuit having a latch and a detector circuit, the method comprising:
    comparing by the detector circuit, the signal states on the complementary data lines; and
    generating by the control circuit an alarm signal asynchronously if identical logic signal states are ascertained in the regular operating phase, without dependence on a clock signal.

14. The method as claimed in claim 13, further comprising generating an alarm signal asynchronously when identical signal states which are opposite to the precharge state are ascertained in the precharge phase.

15. The method as claimed in claim 14, wherein, in the regular operating phase, an alarm signal is only generated when the identical logic states are opposite to the precharge state.

16. The method as claimed in claim 13, wherein an alarm signal is only output when an activation signal indicates that a detection of manipulation attempts is to be activated.

17. A circuit arrangement comprising:
    complementary data lines of a dual rail data bus, wherein in a regular operating phase the complementary data lines carry real-time complementary dual-rail data signals, and in a precharge phase the complementary data lines assume an identical logic state or the same electrical potential;
    a read-write circuit;
    a control means, which is disposed downstream of the read-write circuit, for detecting manipulation attempts, the control means comprising a latch, a precharge controller, and a detector means, wherein the control means outputs an alarm signal asynchronously upon the occurrence of an identical logic state on both data lines in the regular operating phase, without dependence on a clock signal; and
    a memory cell array disposed downstream of the control circuit.

* * * * *